United States Patent
Narasimhan et al.

(10) Patent No.: US 8,681,661 B2
(45) Date of Patent: Mar. 25, 2014

(54) LIMITING MAC ADDRESS LEARNING ON ACCESS NETWORK SWITCHES

(75) Inventors: Janardhanan P. Narasimhan, Chennai (IN); Krishnamurthy Subramanian, Mountain View, CA (US); Thayumanavan Sridhar, Sunnyvale, CA (US)

(73) Assignee: Force10 Networks, Inc., San Jose, CA (US)

( * ) Notice: Subject to any disclaimer, the term of this patent is extended or adjusted under 35 U.S.C. 154(b) by 180 days.

(21) Appl. No.: 13/280,416

(22) Filed: Oct. 25, 2011

(65) Prior Publication Data

US 2013/0039218 A1  Feb. 14, 2013

Related U.S. Application Data

(60) Provisional application No. 61/406,298, filed on Oct. 25, 2010.

(51) Int. Cl.
*H04L 12/28* (2006.01)
*H04L 12/56* (2011.01)
*G06F 15/16* (2006.01)

(52) U.S. Cl.
USPC ............ 370/255; 370/351; 370/392; 709/232

(58) Field of Classification Search
USPC ................. 370/217–236, 255–389, 392–412; 709/221–232, 245–249
See application file for complete search history.

(56) References Cited

U.S. PATENT DOCUMENTS

| | | | | |
|---|---|---|---|---|
| 7,149,214 B2* | 12/2006 | Wu et al. | ........................ | 370/389 |
| 7,697,552 B2* | 4/2010 | Bruckman | .................... | 370/405 |
| 7,822,027 B2* | 10/2010 | Yadav et al. | .................. | 370/389 |
| 8,144,698 B2* | 3/2012 | Sargor et al. | .................. | 370/389 |
| 8,259,726 B2* | 9/2012 | Subramanian et al. | ........ | 370/392 |
| 8,370,834 B2* | 2/2013 | Edwards et al. | .................. | 718/1 |
| 2007/0008949 A1* | 1/2007 | Balandin | ....................... | 370/351 |
| 2009/0257439 A1* | 10/2009 | Xu | ................................ | 370/401 |
| 2010/0008365 A1* | 1/2010 | Porat | ............................. | 370/392 |
| 2011/0271009 A1* | 11/2011 | Doshi et al. | .................... | 709/242 |
| 2011/0310904 A1* | 12/2011 | Gero et al. | ..................... | 370/401 |
| 2012/0224510 A1* | 9/2012 | Bulusu et al. | ................. | 370/256 |
| 2013/0124750 A1* | 5/2013 | Anumala et al. | .............. | 709/232 |

* cited by examiner

*Primary Examiner* — Man Phan
(74) *Attorney, Agent, or Firm* — Haynes and Boone, LLP (57) ABSTRACT

A LAN includes a CORE switch linked to some number of TOR switches, and each of the TOR switches are linked directly to some number of host devices. Each of the switches in the LAN operate to process and transmit data frames they receive from neighboring LAN devices. Each TOR switch in the LAN builds and maintains a layer-2 forwarding table that is comprised of MAC address information learned from frames they receive from neighboring LAN devices. Selected ports/VLANs on some or all of the TOR devices are designated to be CORE/switch facing ports (CFP) or host facing ports (HFP). Each of the CFPs are configured to only learn the MAC address in unicast frames it receives and each of the HFPs can be configured to learn the MAC address of both unicast and multicast data frames provided the destination MAC address included in the unicast frame is known.

18 Claims, 7 Drawing Sheets

| DEST. MAC ADDR. | VLAN.ID | EGRESS PORT ID |
|---|---|---|
| H.0 | A | HFP.0/H.0 |
| H.39 | A | HFP.0/H.39 |

1ST FIELD — DEST. MAC ADDR.

TOR L-2 TABLE 50

1ST ENTRY — H.0 ately 140 characters.

LIMITING MAC ADDRESS LEARNING ON ACCESS NETWORK SWITCHES

BACKGROUND

1. Field of the Invention

The present disclosure relates generally to MAC learning in an Ethernet based network, and specifically to limiting MAC address learning on Top Of Rack (TOR) switches directly connected to host devices to only those host MAC addresses that are actively involved in exchange of data with hosts behind this switch.

2. Description of the Related Art

Figure 1:
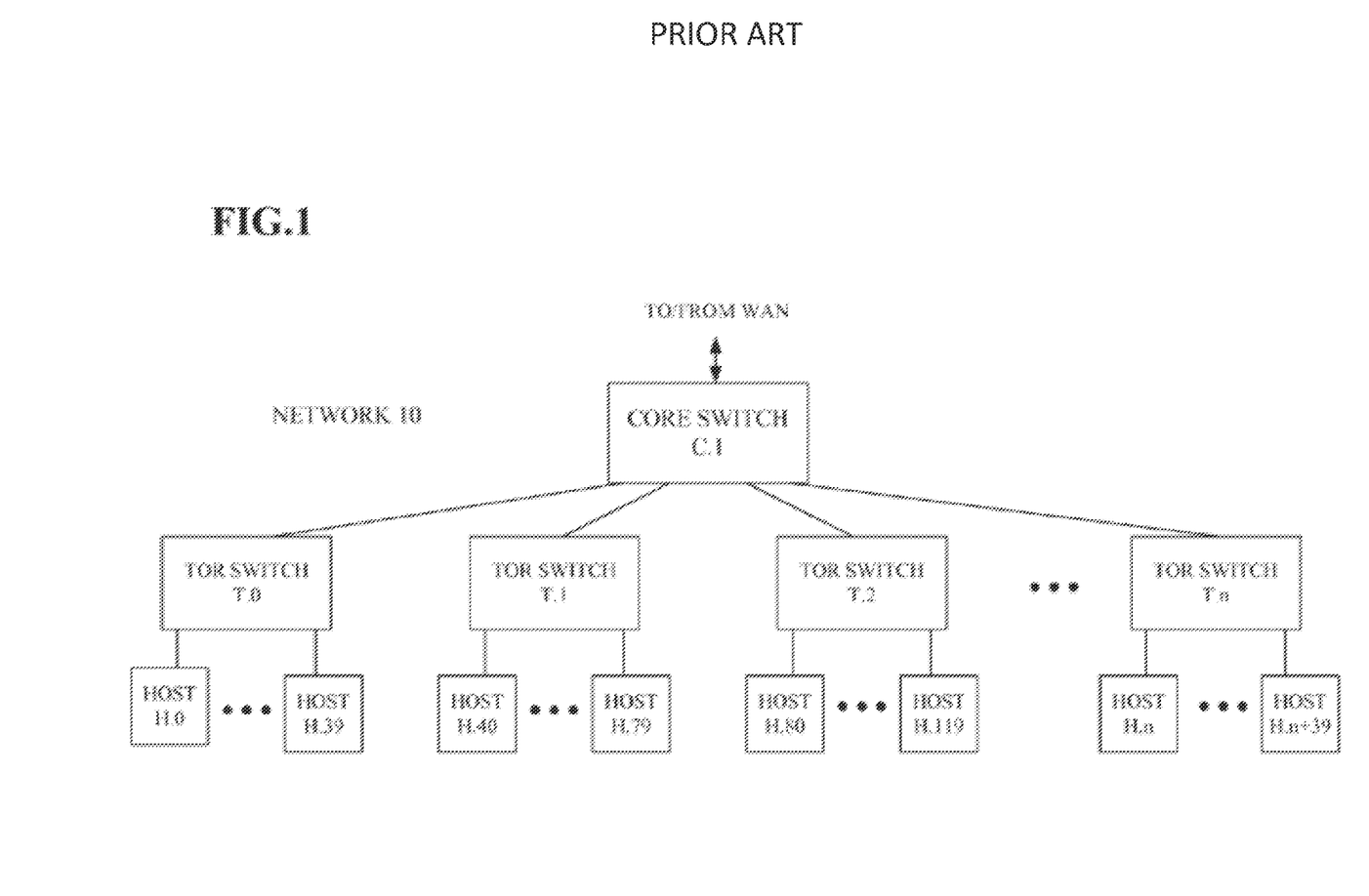
FIG. 1 is a diagram of a local network 10.

Each of a plurality of frame network devices comprising a local network operating according to the Ethernet protocol can send and receive data frames to each other based upon the physical (MAC) address of the device. Typically a local Ethernet network, such as a data center, includes some number of CORE devices linked to a number of top-of-rack (TOR) devices each of which is associated with one or more servers or host devices. The CORE and TOR devices can be network switches operating to send and receive data frames at the data link layer (L2) and at the network layer (L3) of the well know OSI network model. FIG. 1 illustrates an Ethernet network 10 topology that includes one CORE device (C1), linked to a number of TOR devices (TOR1-TORn) each one or which is associated with one or more host devices (H.0-H.139). According to the network 10 topology in FIG. 1, each of the host devices can send/receive data frames to/from each of the other host devices in the network.

Generally, CORE and TOR devices in a network, such as network 10, operate to receive a data frame at an ingress port, process the data frame to determine the destination or next hop that the frame should be sent to (if the switch is not itself the destination) and then send the data frame out an egress port to its intended destination. After the data frame arrives at an ingress port, the switch can examine, among other things, the header in the data frame for information that identifies the destination device to which the data frame is to be sent. This destination information can be the destination MAC address and IP address of a host device linked to a TOR, or it can be address information associate with some other device in the network. Each network switch then can use this address information to determine how to forward data frame to a next hop in the network.

In order for the TOR and CORE devices comprising network 10 to transmit data frames received from any of the other devices in the network (CORE, TOR, Host device) to their intended destination, it is necessary for each of these devices to build and maintain a forwarding table that can include MAC address information assigned to each of the host devices comprising the network, or at least address information associated with the destination host devices to which data frames are sent. This address information can be learned using well know network address learning techniques, such as MAC learning (described in the IEEE standard document 802.1D) or via the address resolution protocol (ARP).

Figure 2:
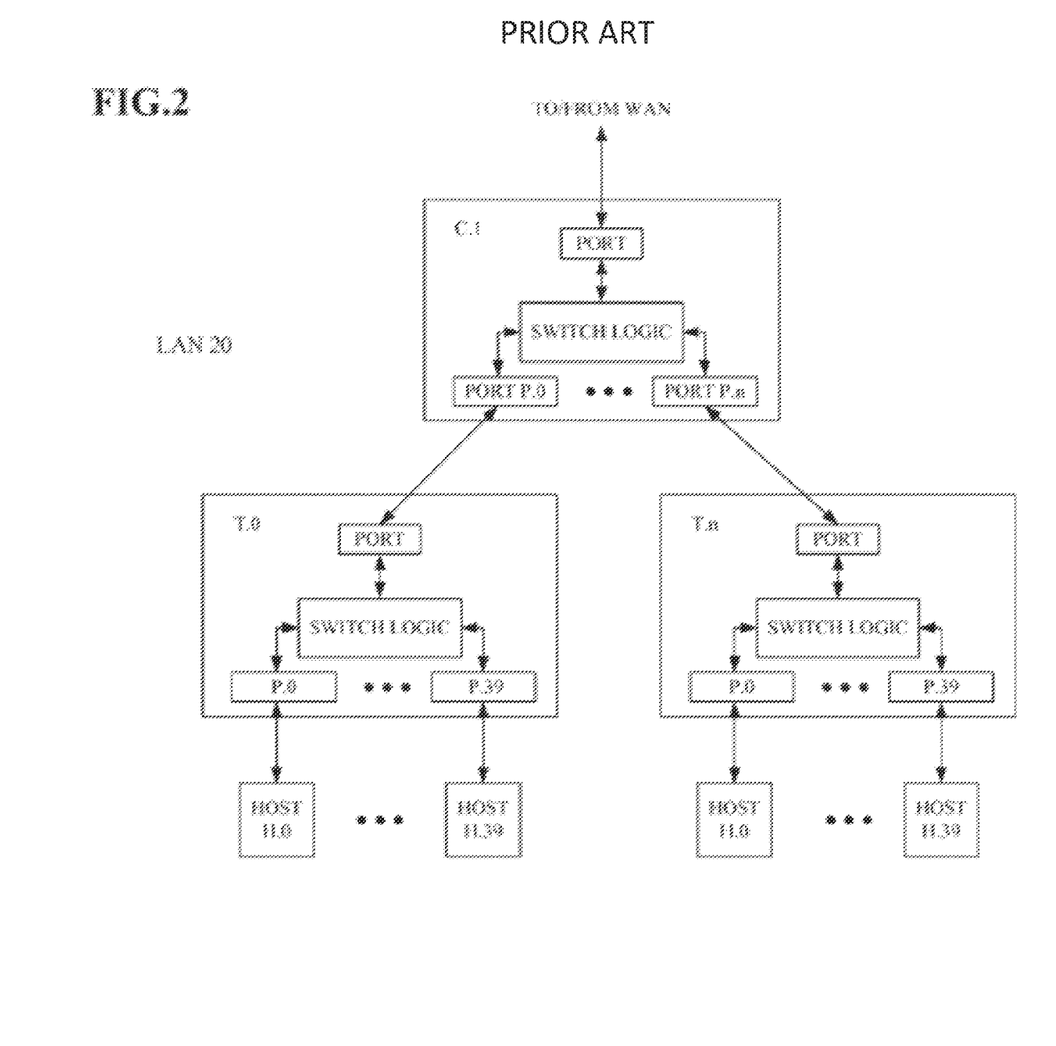
FIG. 2 is a diagram of a local network 20.

The above MAC learning method will now be described with reference to FIG. 2. In the event that host H.0 on TOR T.0 has one or more data frames to transmit to host H.39 on TOR T.n, host H.0 (assuming H.O on T.0 knows the IP address of H.39 on T.n but not the MAC address) can broadcast an ARP request frame that will be received by the CORE switch C.1, by each of the TORs connected to the CORE switch C.1, and by each of the host devices connected to each of the TOR switches. Among other things, the ARP request includes the IP address of the destination host (H.39) and it includes the MAC address of the source host (H.0). Each of the CORE and TOR switches in the network and certain of the host devices receive the ARP request, examine its contents and store the MAC address of the host H.0. More specifically, the MAC address of host H.0 is learned on port P.0 by TOR T.0 and this address is placed into a forwarding table in association with port P.0, then CORE switch C.1 learns the host H.0 MAC address and stores the address in its forwarding table in association with the port on which the address is learned. All of the other TOR switches connected to CORE switch C.1 learn the host H.0 MAC address on their ports that are linked to the CORE switch and store it in their forwarding tables. Host devices receiving this ARP store the MAC address if they are already communicating with this host or if the receiving host is the target of this ARP request.

Ethernet networks have become ubiquitous and are growing in popularity and usage, especially in the Data Center (DC) environment. This popularity is driving the large scale adaptation of Ethernet technology which in turn is driving down the cost and increasing the speed at which these networks operate. With the large scale adaptation of Ethernet technology, the number of network devices comprising an Ethernet network is increasing. In addition to the increasingly more numerous physical devices connected to such a network, each physical device can be configured to support a number of virtual devices or machines (VM) that operate in conjunction with one or more of the hosts, such as the host devices shown in FIG. 2. Each VM can be assigned a unique MAC address, which, depending upon the number of virtual machines in a local network, can result in a large number of MAC addresses being maintained in the forwarding tables of frame switches that are aware of some or all of the virtual machines.

CROSS REFERENCE TO RELATED APPLICATIONS

This application claims the benefit under 35 U.S.C. §119 (e) of U.S. Provisional Patent Application Ser. No. 61/406, 298 entitled "Method for the Reduction of MAC Table Size", filed Oct. 25, 2010, the entire contents of which is incorporated herein by reference.

DETAILED DESCRIPTION

Typically, the frames entering a switch are processed by functionality that has access to a limited amount of on-board memory on which to store forwarding table information. The requirement to increase the size of these forwarding tables to accommodate a flat MAC addressing scheme becomes untenable even for the high end switches available in the market. As a consequence of building and maintaining flat forwarding tables in the data plane of a network switch, switches typically learn the MAC addresses of all the nodes in the network that they can reach.

As described earlier in the background section, current MAC learning techniques can result in a network switch storing a very large amount of address information in their forwarding table memory. The forwarding table in a switch can, at any point in time, store one entry for each of the MAC addresses of the devices (physical and/or virtual) that it can communicate with. In a network including forty servers per rack, and with each server configured to support twenty VMs, there are eight hundred addresses per rack. If the network has two hundred such racks, then the total number of MAC addresses that can be learned is one hundred and sixty thousand (160,000). However, not all of the address information stored in forwarding table memory may be needed by the switch to support the forwarding of data frames from one host device to another host device in the network.

One technique that is used to limit the number of addresses that are learned and stored is to remove those addresses from a forwarding table that have not been accessed for some specified period of time. However, even this technique for limiting the number of currently stored addresses can result in storing a number of learned addresses which is much beyond the capacity of most switch memory dedicated for storing forwarding table information. Designing switches with larger L2 MAC table capacity can increase the cost of the switch and can also increase the power consumption of such switches.

Therefore, it would be advantageous if those switches connected directly to host devices in a local network did not learn the MAC address of every host device with which it can communicate. Rather, if those switches that are connected directly to host devices in the local network only learned the MAC address of a host, with which it is currently communicating, the amount of switch memory that is dedicated to storing forwarding table address information can be reduced. This can have the effect of lowering the overall cost of the switch and reducing the amount of power needed for the switch to operate. A technique has been discovered that limits MAC address learning to only those network switches that are both in the path between any two or more network host devices that are transmitting and/or receiving data frames to each other and directly linked to at least one of the host devices. For the purposes of this description, two or more host devices that are transmitting and receiving data frames to each other are said to be in a conversation. In one embodiment, the host MAC addresses learned by each TOR are limited to only those addresses that are associated with the host devices that are active members of the conversation.

Figure 3:
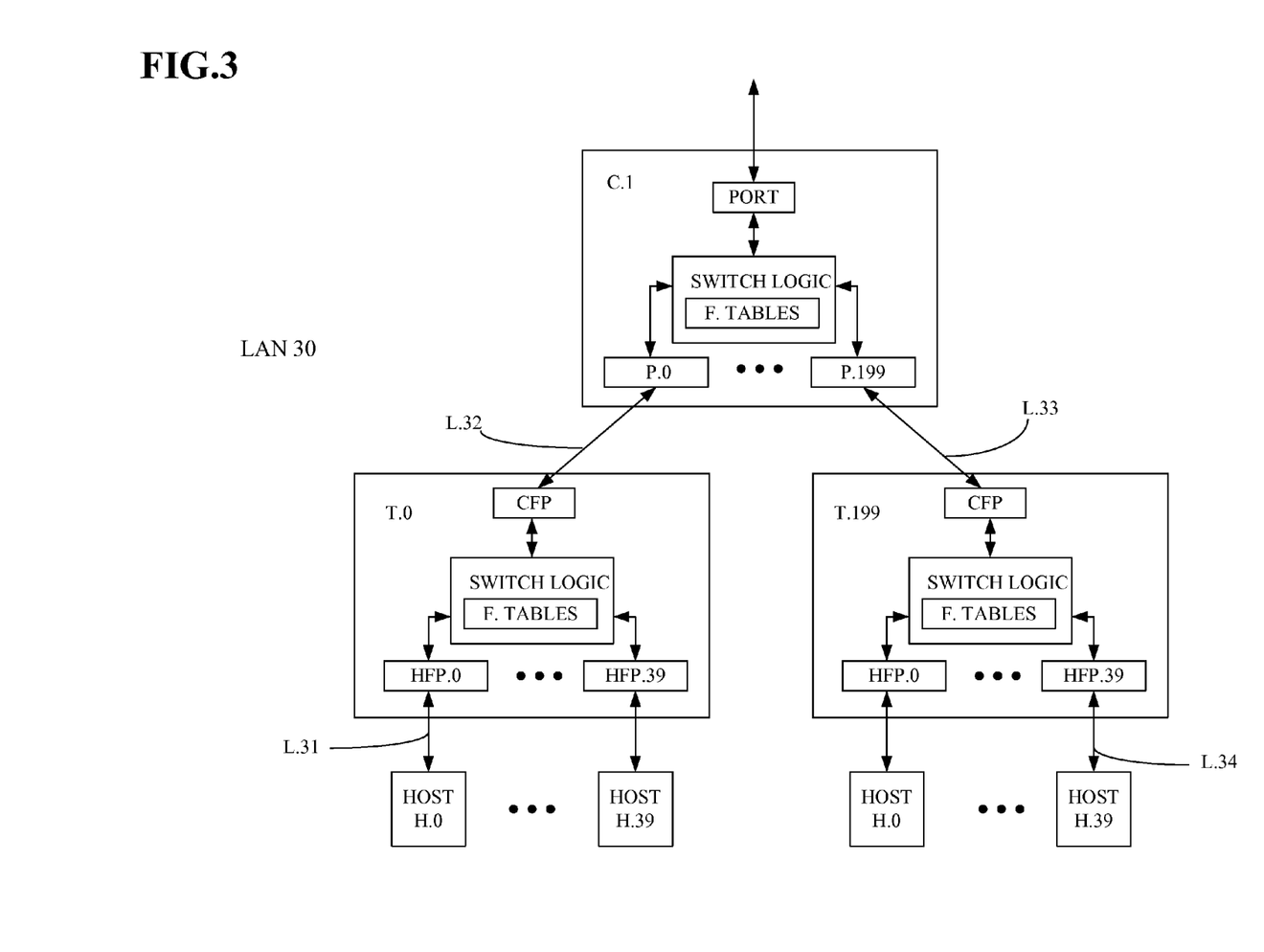
FIG. 3 is a diagram of a local network 30.

Data centers (DC) can be configured with a network topology similar to that illustrated in FIG. 3. A DC LAN 30 is comprised of at least one CORE switch C1 (there can be multiple redundant CORE switches), two hundred TOR switches T.0-T.199, and eight thousand host devices. Each TOR switch is directly linked to forty host devices, each of which can be configured to generally operate in conjunction with network applications to provide certain services. The COR switch C.1 is comprised of switch logic and a plurality of ingress/egress ports for receiving and transmitting data frames respectively. The switch logic is generally comprised of means to examine received data frames and determine how to forward the frames to their destinations. The switch logic can also include means to run network protocols which, among other things, operate to build and maintain tables (layer 2 and layer 3) comprised of address information used by the switch to determine how to forward the frame to their destinations, and the switch logic can include a switching fabric which operates to propagate each frame from the ingress port to an egress port in the switch. Each of the TOR switches are comprised of switch logic (similar to the CORE switch logic described above) and a number of ingress and egress ports. Referring to TOR T.0, one port is designated to be a CORE or switch facing port (CFP) and is connected over a link 32 to port P.0 located on the CORE switch C.1. Another port on T.0 is designated to be a port that is facing the host H.0 and is labeled HFP. 0, and another port on T.0 is designated to be a port that is facing host H.39 and is labeled HFP.39. The term "facing" in this context is an indicator of which or what type of network device the port is connected to. For example, ports designated to be facing a CORE switch are all linked directly to a CORE switch, and ports designated to be facing a host device are all linked directly to a host device.

Continuing to refer to FIG. 3, and according to one embodiment, ports on a TOR that are designated to be host facing ports (HFP) are configured to learn the MAC address of all data frames (unicast, multicast, broadcast) received over those ports, and this type of MAC learning is referred to herein as all-frame MAC learning (AF-ML). The ports on a TOR that are designated to be CORE or switch facing ports (CFP) are configured to only learn the MAC address included in unicast data frames received over these ports provided the destination MAC of this frame is already learnt by the switch, and this type of MAC learning is referred to herein as unicast frame MAC learning (UF-ML). The switch logic included on each TOR switch can include means to control the type of learning configured on each port or on each VLAN of the switch on a per port and/or per VLAN basis. Hardware registers included in the switch logic can be set for each port to select the type of MAC learning, for that port. UF-ML or AF-ML would be an option that can be enabled on a port by port basis depending on if it is a CF or a SF port.

In lieu of the switch port MAC learning configurations described above with reference to FIG. 3, MAC learning at HFP and CFP ports on switches T.0 and T.199 occurs as described below with reference to the logical flow diagram of FIGS. 4A-4C. For the purpose of this description, it is assumed that host the H.0 connected to TOR switch T.0 has a data frame for transmission to H.39, which is connected to TOR switch T.199, and that the host H.0 knows the IP address of H.39 but does not know the MAC address of H.39. In this event, in Step 1, H.0 broadcasts a frame/message (which can be either a broadcast ARP request or a unicast data frame) over link L.31 to the HFP.0 on TOR switch T.0. In Step 2, HFP.0 receives the frame and the switch logic on T.0 examines the frame for a source MAC address (MAC address of H.0) and then accesses its L2 forwarding table information to determine if the MAC address is stored there. If in Step 3 the MAC address is not currently stored in the table, the process proceeds to Step 4, and the address is learned and stored in association with the port that received the request, which in this case is the HFP.0, otherwise the process proceeds to Step 5 and the T.0 switch logic determines if the frame is a unicast (regular data frame) or a broadcast frame (Broadcast, Unknown Unicast). If in Step 5, T.0 determines that the frame is not a broadcast frame, then in Step 6 the frame is transmitted out the port on which this MAC is learnt. On the other hand, if in Step 5 it is determined that the frame is a broadcast frame, then in Step 7 the frame is broadcast/flooded to all of the host devices directly linked to T.0, and it is transmitted out the CFP to CORE switch C.1 port P.0 over link L.32.

Figure 4A:
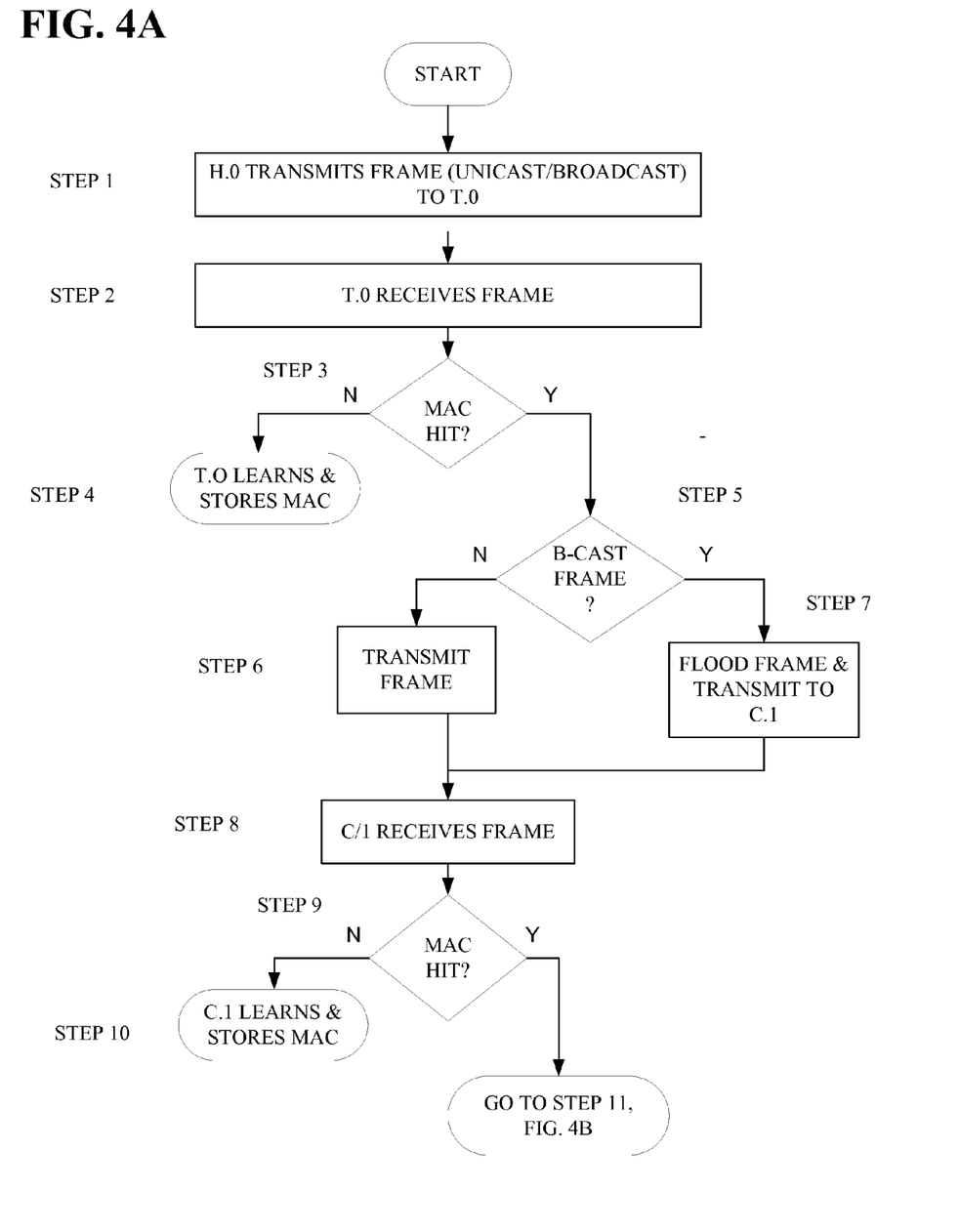
FIGS. 4A-4C illustrate a logical flow diagram of one embodiment.

Continuing to refer to FIG. 4A, in Step 8, C.1 receives the frame from T.0 and examines its L2 forwarding table for the source MAC address included in the frame. If in Step 9 it is determined that the MAC address is not stored in the switch, then in Step 10 C.1 stores the address in its L2 table in association with port P.0. On the other hand, if in Step 9 C.1 determines that the source MAC address is stored in its L2 table, the process proceeds to Step 11 in FIG. 4B where C.1 determines if the frame is unicast or broadcast. If in Step 11

C.1 determines that the frame is unicast, then in Step 12 it transmits the frame over the destination port on C.1. On the other hand, if in Step 11 C.1 determines that the frame is a broadcast frame (ARP request for instance), then in Step 13 C.1 floods the frame to all TORs linked to it (other than the TOR, T.0, from which it receives the frame). In Step 14, all of the TORs or the destination TOR receives the frame on their CFP(s), and in Step 15 determine whether the frame is unicast or broadcast, and if it is determined that the frame is unicast, and the frames destination MAC address is already stored at the L2 table, then in Step 16 the source MAC address is learned and stored on the TOR's L2 forwarding table in association with the port on which the frame ingressed, and the process proceeds to Step 18. However, if in Step 15 C.1 determines that the frame is a broadcast frame (ARP request for instance) or a unicast frame whose destination MAC address is not known, then the process proceeds to Step 17. As the CFPs on each TOR switch are configured to only learn the source MAC addresses of unicast frames, the MAC address in the multicast frame is not learned and stored in the L2 forwarding tables on at least those TORs with ports designated to be CFPs. In Step 18, the TOR(s) (TOR T.199 for the purpose of this description) floods the broadcast frame to all of the host devices linked to the TORs (TOR T.199 in this case). In Step 19 the host devices receive the frame.

Figure 4B:
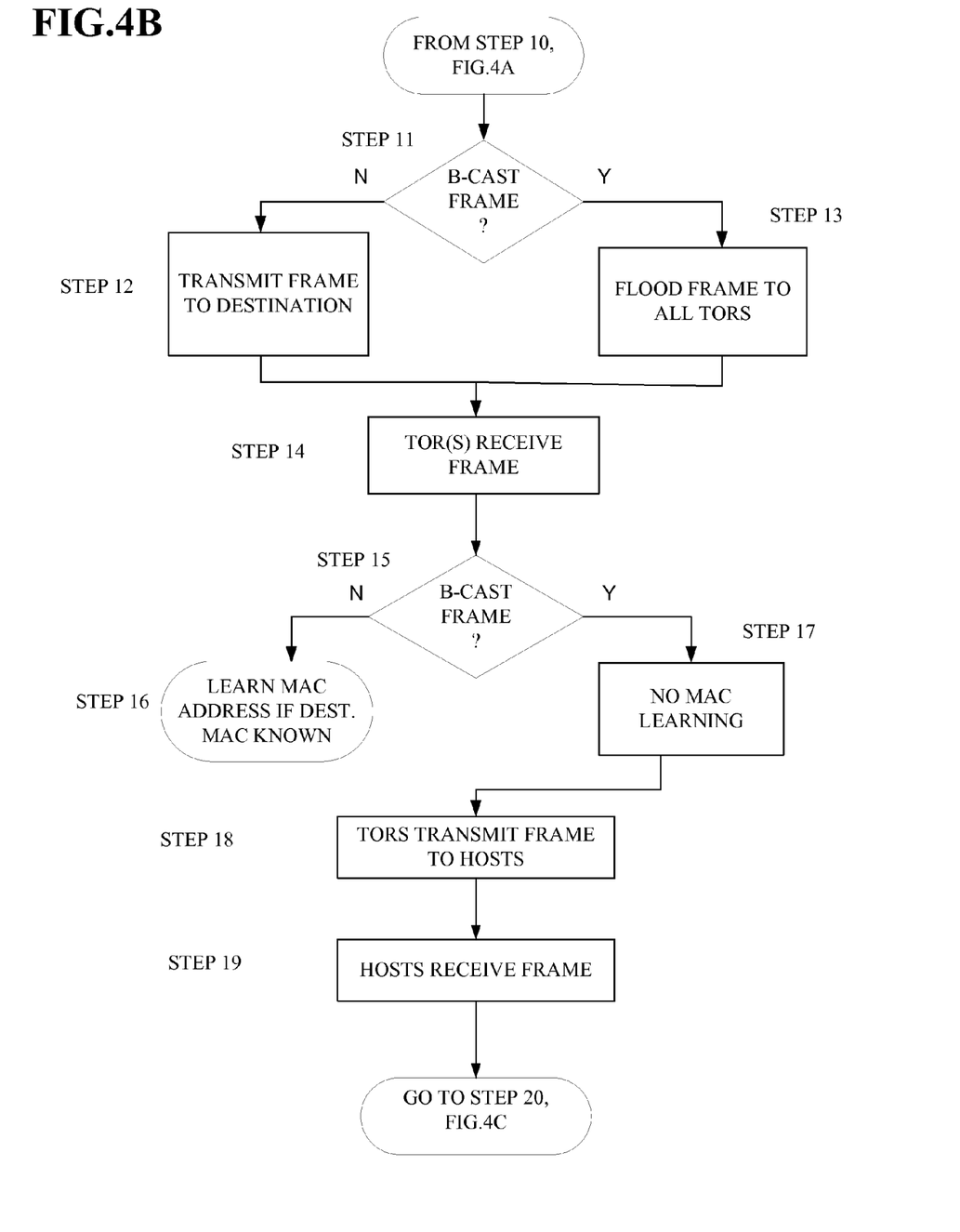
Figure 4C:
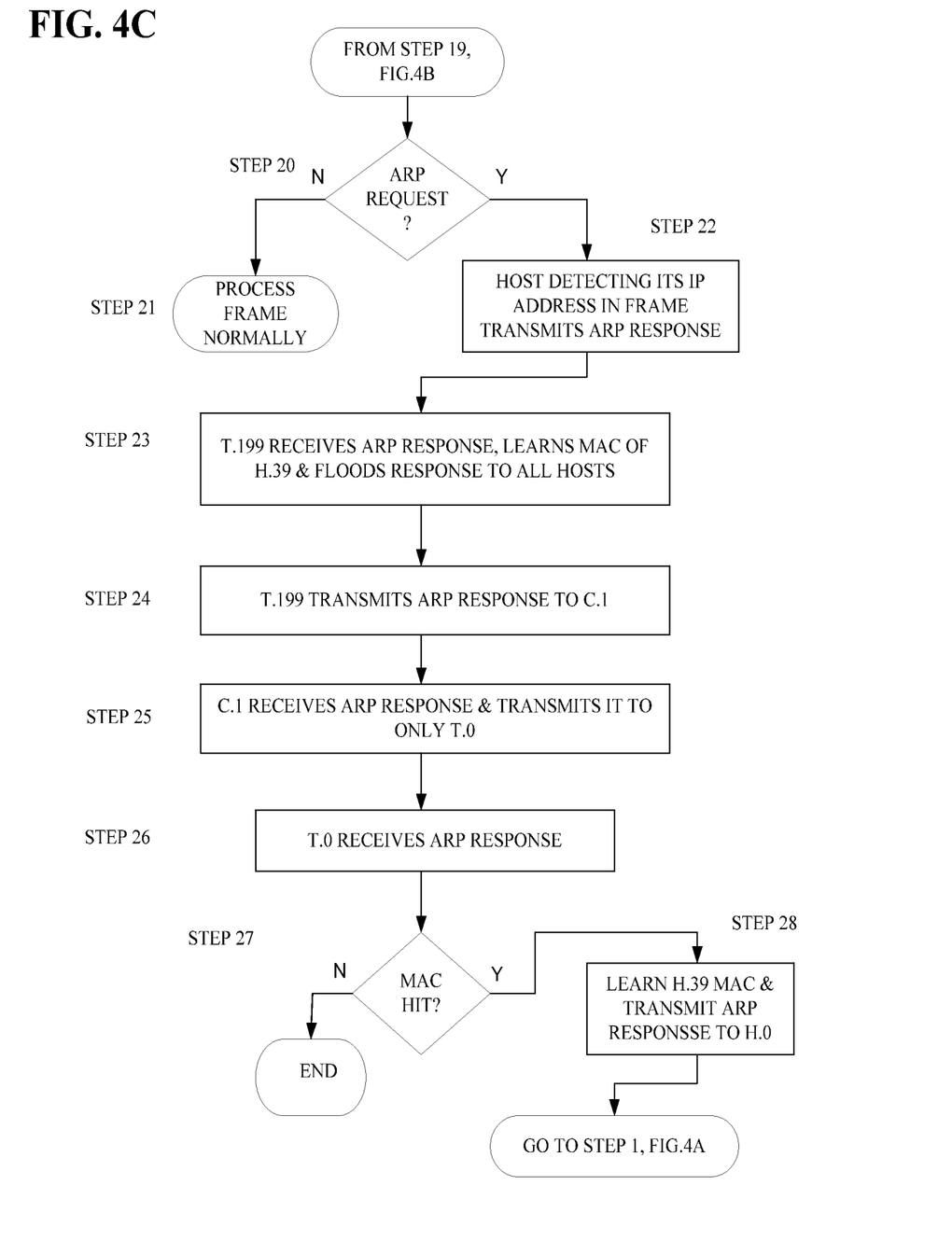

In step 20 of FIG. 4C, the host devices determine whether the frame is an ARP request or not. If the frame is not an ARP request (can be a regular data frame), then in Step 21 the frame is processed in the normal manner, otherwise the process proceeds to Step 22 and the host H.39 processes the ARP request (because it is the destination host) and transmits an ARP response frame over link L.34 to HFP.39 on TOR T.199 (because it detects its IP address in frame). In Step 23, the HFP.39 on T.199 receives the ARP response frame, learns the source MAC address of H.39 and floods (because the MAC address of H.0 linked to T.0 has not yet been learned on T.199) the ARP response to all of the HFPs (HFP.0-HFP.38) on each of the host devices (H.0-H.38) connected to it, and in Step 24 it transmits the ARP response to the CORE switch C.1 as a unicast frame over link L.33. In Step 25, C.1 receives the ARP response frame on port P.199 and switches the frame out port P.0 to T.0 (only switched to T.0 because the frame is unicast and the MAC address of host H.0 was previously learned in Step 10). In Step 26, TOR switch T.0 receives the ARP response frame on its CFP, and in Step 27 determines whether the destination MAC address (MAC of H.0) is stored in its L2 forwarding table. If the MAC address of H.0 is not found, the process ends, otherwise the process proceeds to Step 28 and T.0 learns the MAC address (as the response is a unicast frame and the destination MAC is already learnt on the switch and the CFP is configured to only learn unicast frames) of H.39 on the CFP and forwards the frame to the host H.0. The process then can return to Step 1, in FIG. 4A.

In order for data frames to be transmitted successfully between host H.0 on TOR switch T.0 and host H.39 on TOR switch T.199, it is necessary for the TOR switch T.199 to learn the MAC address of the host H.0 on its CFP (this address was not learned earlier as the ARP request is a multicast frame and CFPs are not configured to learn the addresses of multicast frames). In this regard, T.199 is able to learn the MAC address of host H.0 from the next unicast data frame sent by the host H.0 to the host H.39 as follows. Returning to Step 1 of FIG. 4A, host H.0 linked to TOR switch T.0 transmits a unicast data frame destined for H.39 linked to TOR switch T.199 (frame includes MAC destination address of H.39 as well as the MAC source address of H.0). In Step 2, T.0 receives the frame, and in Step 3 determines that the MAC address of H.0 is stored in its forwarding table and proceeds to Step 5. In Step 5 T.0 determines that the frame is unicast (not multicast) and so proceeds to Step 6. In Step 6 the frame is transmitted to CORE switch C.1, and in Step 8 C.1 receives the frame and examines the destination MAC address, and in Step 9 determines that the address is stored in its forwarding table.

In Step 11 of FIG. 4B, C.1 determines that the frame is unicast (not broadcast) and in Step 12 transmits the frame to TOR switch T.199. TOR switch T.199 receives the frame on its CFP and in Step 15 determines that it is a unicast frame and in Step 16 learns the source MAC address of H.0, since the MAC Destination is already learnt on the L2 table. (CFP is configured to learn source address in unicast frames). The frame is then transmitted by T.199 to the destination host, host H.39 in this case. At this point, only those switches that are in the path between H.0 and H.39 and which are directly linked to the two hosts have learned the MAC addresses of both host devices and are able to support the transmission of data frames back and forth between the two host devices.

Figure 5:
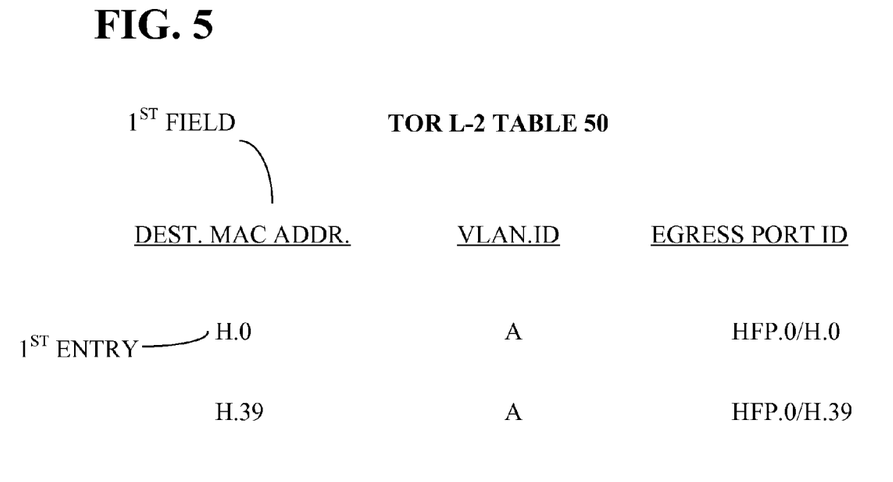
FIG. 5 is a diagram showing the format of an embodiment of a L-2 forwarding table.

According to the embodiment described with reference to Figures A-C, each switch in a LAN that is directly linked to a host device that is transmitting and/or receiving data frames to/from at least one other host device connected to the LAN can learn the MAC addresses of only those host devices communicating with each other or that are in a conversation. This MAC learning technique is referred to here as conversational MAC learning. FIG. 5 show an example format of a TOR switch layer-2 forwarding table that is build according to the embodiment described above with reference to FIG. 4A-4C. In this case, a TOR L-2 forwarding table 50 is stored in TOR switch T.0 is comprised of two entries, and each entry is comprised of three fields. Each entry corresponds to the MAC address of a first host device to which the TOR is directly linked and the MAC address of at least one other host device receiving or transmitting data frames from or to the first host device. A first field in each entry stores the MAC address of each host for which the TOR is currently supporting transactions. This first field is labeled "Destination MAC" and table 50 includes two entries in this field, one entry for the MAC address of H.0 and one entry for the MAC address of H.39. A second and third field are labeled VLAN.ID and Egress Port.ID respectively. The second field can store VLAN identity information associated with the packet.

MAC address information stored in the TOR L-2 forwarding table described above with reference to FIG. 5 can be removed from the table after a specified/programmable period of inactivity. This removal of MAC addresses from a forwarding table is referred to here as a MAC Address Table Timeout (MATT), and according to one embodiment of the invention MATT can be configured on a per port/VLAN basis. The ability to configure ports/VLANs in this manner permits a network administrator to configure a timeout period for core facing ports (CFPs) that is shorter than the period configured on non-CFPs has the beneficial effect of reducing the number of MAC addresses stored in association with the CFPs on TORs linked to host devices, and limiting the MAC addresses that are learned to only addresses associated with host devices that are actively transmitting and receiving data frames. In the event that a MAC address table timeout occurs in a L-2 forwarding table for a MAC address that is stored in association with a CFP and HFP in a TOR switch connected to a host, and the host has retained the one or more MAC addresses in their ARP cache, then the is no need to initiate the normal ARP request process. Rather, the host which has retained the address can simply transmit a unicast data frame to the destination MAC address in ARP cache and the destination host device, which can be host H.39, can send a unicast data frame back to host H.0. In the course of transmitting and receiving the frame, the TOR devices that are in the path between H.0 and H.39, and which have removed the MAC addresses of these two host devices from their forwarding tables, will relearn these MAC addresses.

Typically, in the event of a MAC move, where a server moves from one port to another port within the same TOR, or across TOR, the server will send a (Gratuitous ARP) GARP when it comes up on the new port. The following description uses the GARP to show how MAC learning will happen when a server moves within the same TOR, but in case the GARP is missed, the mechanism described with reference to Figures A-C can resolve the MAC move when eventually the server sends a packet from the new port. When a TOR receives a GARP request on a CFP, it should trap it and process it in the switch logic. If the MAC SA of this packet is already stored on one of the SFPs, than this should be a MAC move, and the MAC is then learnt on the CFP, or else it is simply flooded but no learning occurs. The GARP on the new port will move the MAC address from the original port on the TOR to the new port. This GARP will also be sent out to the rest of the network, but this will not change any of the other TORS learning, as none of them learn from flooding traffic on the CF ports. Those ports that have already learned the address will still retain the same address, and those that have not learned the address will not learn it, and hence there will be no changes to them.

Alternatively, in the event that a MAC moves from one TOR to second different TOR (Server moves), the second TOR (Where the server has moved), will learn the address from a GARP message, and also will flood this message. This will again have no change on any of the other TORs. For TORs other than the original TOR, it will make no difference since either they will not have this, or already have it and pointing to the CFP. For the original/first TOR, the GARP is trapped to the CPU, and since this MAC is learnt on the SF ports, it will learn this as a MAC move, and move this MAC address to the CF.

The forgoing description, for purposes of explanation, used specific nomenclature to provide a thorough understanding of the invention. However, it will be apparent to one skilled in the art that specific details are not required in order to practice the invention. Thus, the forgoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

We claim:

1. A method of learning a physical address of one or more host device in a local network, comprising:
    configuring a plurality of local network switches, each of which are linked directly to one or more host devices, to only learn a physical address of a first host device to which it is directly linked and to only learn a physical address of a second host device to which it is not directly linked provided the physical address of the second host device is included in a unicast frame and the physical address of the first host device is known, wherein the configuring includes configuring a first local network switch of the plurality of local network switches by:
        designating at least one port on the first local network switch that is directly linked to the first host device to be a host facing port and to learn the physical address of the first host device included on any type of frame received; and
        designating at least one port on the first local network switch that is not directly linked to the second host device to be a switch facing port and to learn the physical address of the second host device included only in unicast frames received;
    the first host device broadcasting an Address Resolution Protocol (ARP) request;
    each one of the plurality of the local network switches receiving the ARP request, but only the first local network switch learning the physical address of the first host device;
    a second host device receiving the ARP request and transmitting an ARP response to the first host device that includes the physical address of the second host device and the physical address of the first host device; and
    the first local network switch receiving the ARP response and learning the physical address of the second host device included in the ARP response provided that the physical address to the first host device is known.

2. The method of claim 1, further comprising:
    the first host device sending a unicast frame that includes a destination physical address of the second host device, and a second local network switch of the plurality of local network switches that is linked directly to the second host device learning the physical address of the first host device.

3. The method of claim 1, wherein the physical address of each of the first host device and the second host device includes a MAC address.

4. The method of claim 3, wherein the MAC address includes a source address or a destination address.

5. The method of claim 1, wherein the first local network switch is a Top Of Rack (TOR) switch, and wherein the switch facing port is coupled to a CORE switch.

6. The method of claim 1, wherein configuring the first local network switch comprises designating two or more ports that are linked to host devices to be members of a first VLAN, and configuring all of the ports that are members of the first VLAN to learn the physical address of a host device included on any type of frame received by the ports that are member of the first VLAN, and designating two or more ports that are linked to one or more local network switches to be members of a second VLAN, and configuring all of the ports that are members of the second VLAN to learn the physical address of a host device included only in unicast frames that that are received by ports that are members of the second VLAN.

7. The method of claim 1, wherein the physical address of each of the first host device and the second host device includes either a MAC address of a source host device or a MAC address of a destination host device.

8. The method of claim 1, wherein the second host device is linked directly to the first local network switch or is not linked directly to the first local network switch.

9. A method of learning a physical address of one or more host devices in a local network, comprising:
    configuring each of a plurality of local network switches that are included in a local network and that are linked directly to one or more host devices to only learn a physical address of a host device that is a member of a conversation supported by any one or more of the plurality of local network switches, wherein the configuring includes configuring a first local network switch of the plurality of local network switches by:
designating at least one port on the first local network switch that is directly linked to the first host device to be a host facing port and to learn the physical address of the first host device included on any type of frame received; and
designating at least one port on the first local network switch that is not directly linked to the second host device to be a switch facing port and to learn the physical address of the second host device included only in unicast frames received;
all of the local network switches receiving an Address Resolution Protocol (ARP) request from the first host device, but only the first local network switch linked directly to the first host device learning the physical address of the first host device included in the ARP request; and
the first local network switch receiving an ARP response from the second host device and learning the physical address of the second host device included in the ARP response provided the physical address of the first host device included in the ARP response is known.

10. The method of claim 9, further comprising:
a second local network switch of the plurality of local network switches receiving a unicast data frame and learning the source physical address included in the unicast data frame.

11. The method of claim 9, wherein the physical address of each of the first host device and the second host device includes a MAC address.

12. The method of claim 11, wherein the MAC address includes a source address or a destination address.

13. The method of claim 9, wherein configuring each of the plurality of the local network switches comprises designating two or more ports on a local network switch that are linked to host devices to be members of a first VLAN, and configuring all of the ports that are members of the first VLAN to learn the physical address of a host device included on any type of frame received by the ports that are member of the first VLAN, and designating two or more ports on a local network switch that are linked to one or more other network switches to be members of a second VLAN, and configuring all of the ports that are members of the second VLAN to learn the physical address of a host device included only in unicast frames that that are received by ports that are members of the second VLAN.

14. The method of claim 9, wherein the physical address of each of the first host device and the second host device includes either a MAC address of a source host device or a MAC address of a destination host device.

15. A local network switch, comprising:
switching logic; and
a plurality of local network switch ports, wherein at least one of the plurality of switch ports that is linked directly to a host device is designated to be a host facing port and at least one of the plurality of switch ports that is linked directly to another local network switch is designated to be a switch facing port, and wherein the at least one host facing port is configured to learn a physical address of a first host device included in any type of received frame, and wherein the at least one switch facing port is configured to only learn a physical address of a second host device included in a received unicast frame provided that the physical address of the first host device to which the unicast frame is addressed is known;
wherein, in response to the first host device broadcasting an Address Resolution Protocol (ARP) request, the at least one host facing port learns the physical address of the first host device; and
wherein, in response to the second host device receiving the ARP request and transmitting an ARP response to the first host device that includes the physical address of the second host device and the physical address of the first host device, the at least one switch facing port receives the ARP response and learns the physical address of the second host device included in the ARP response provided that the physical address to the first host device is known.

16. The local network switch of claim 15, wherein the physical address of each of the first host device and the second host device includes a MAC address of a host device.

17. The local network switch of claim 15, wherein the any type of received frame is one of a broadcast frame, a multicast frame and a unicast frame, and wherein the unicast frame is an Address Resolution Protocol (ARP) response.

18. The local network switch of claim 15, wherein the another local network switch is a core switch.

* * * * *